United States Patent [19]

Young, Jr.

[11] 3,842,511
[45] Oct. 22, 1974

[54] INTEGRAL HAND HELD TAILGATING DEVICE

[76] Inventor: Garth Young, Jr., 25441 Via Piedra Blanca, Laguna Niguel, Calif. 92677

[22] Filed: Aug. 7, 1972

[21] Appl. No.: 278,449

[52] U.S. Cl. ............................................... 33/277
[51] Int. Cl. ..................... G01c 3/12, G01b 11/04
[58] Field of Search ............................. 33/276, 277

[56] References Cited
UNITED STATES PATENTS

| 34,608 | 3/1862 | Atteneder | 33/277 |
|---|---|---|---|
| 1,605,884 | 11/1926 | Wilkinson | 33/276 |
| 3,434,214 | 3/1969 | Pratt | 33/277 |

FOREIGN PATENTS OR APPLICATIONS

| 298,589 | 11/1965 | Netherlands | 33/277 |
|---|---|---|---|
| 8,896 | 6/1915 | Great Britain | 33/277 |

Primary Examiner—Louis R. Prince
Assistant Examiner—Richard R. Stearns
Attorney, Agent, or Firm—Fulwider, Patton, Rieber, Lee & Utecht

[57] ABSTRACT

An integral hand held tailgating device for use by a passenger in a trailing vehicle to determine when such trailing vehicle is spaced selected recommended distances behind a lead vehicle for corresponding speeds of travel. The device includes an elongated tube having an eyepiece formed in one end thereof and having a gauge formed in the opposite end thereof. The gauge includes a transparent window having a plurality of sets of transversely spaced indicia thereon with the set of indicia for each respective speed of travel being spaced transversely apart a distance sufficient to cause the apparent width of the lead car to totally fill the space between such indicia when a viewer in the trailing car views the lead car through the transparent window.

3 Claims, 7 Drawing Figures

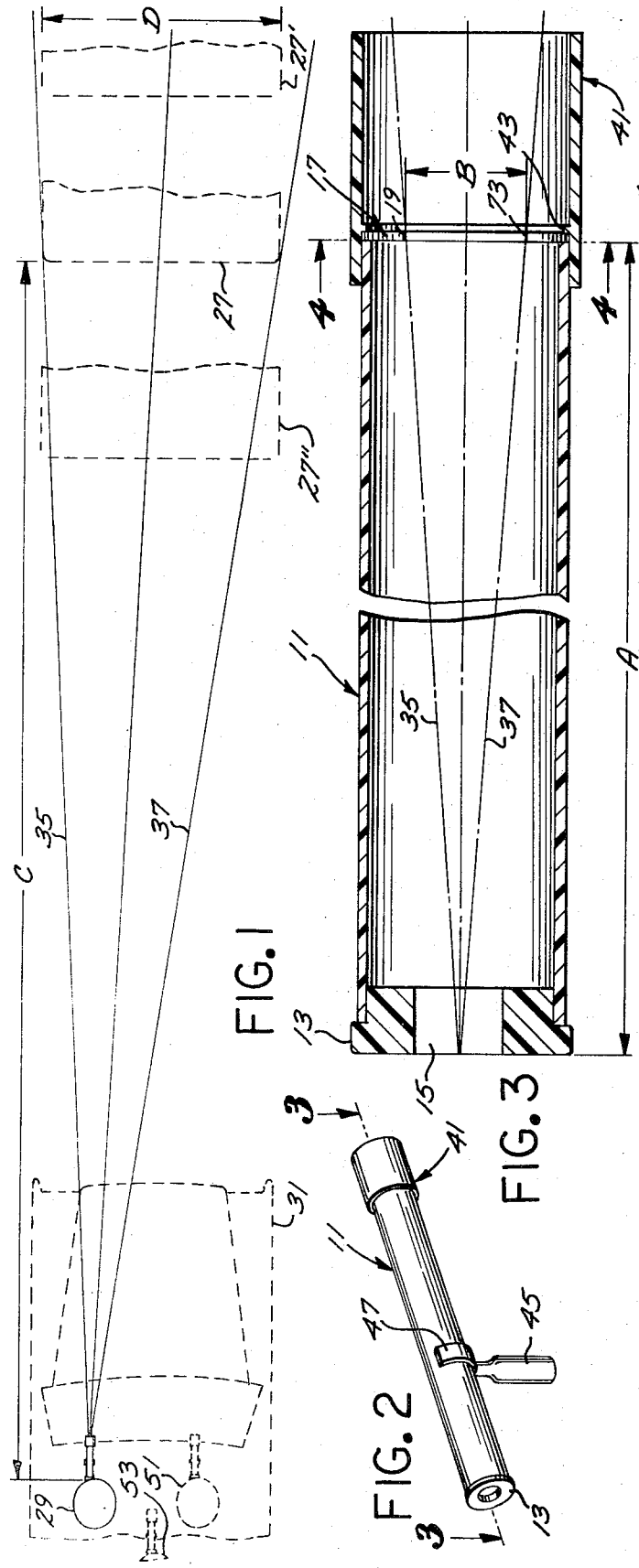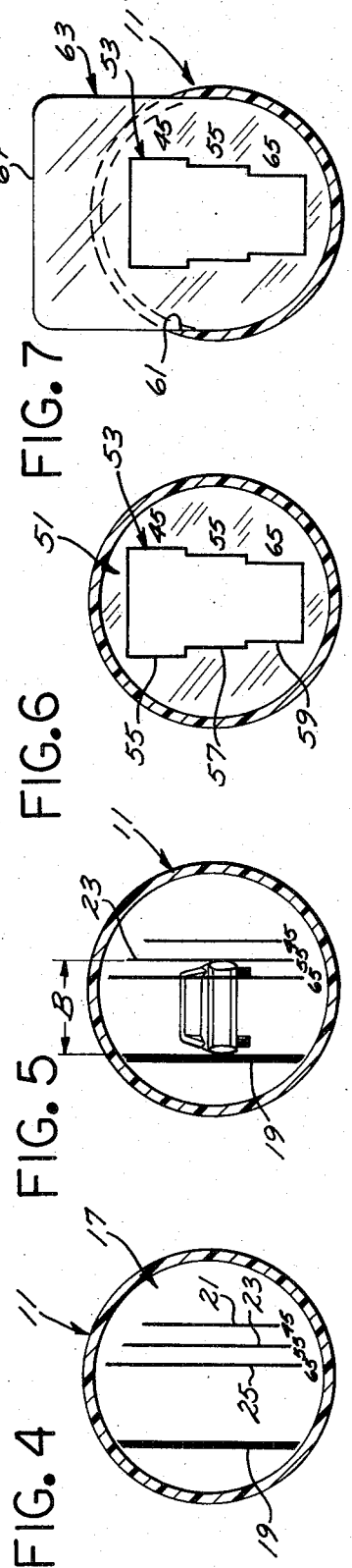

3,842,511

INTEGRAL HAND HELD TAILGATING DEVICE

BACKGROUND OF THE INVENTION

1. Field of the Invention

The integral hand held tailgating device of present invention relates to a device for use by a passenger in a trailing vehicle to determine when such trailing vehicle is a safe distance behind a lead vehicle for the particular speed of travel.

2. Description of the Prior Art

It is well known that during travel on highways, turnpikes and freeways, one should remain progressively greater distances behind a lead vehicle as one's speed of travel is increased. However, the inability of many people to accurately estimate distances and the human tendency to overlook this very basic precaution results in many accidents each year. Consequently, it is desirable to provide a tailgating device which will enable either the driver or a passenger in a trailing vehicle to accurately determine when such trailing vehicle is traveling at a safe distance behind a lead vehicle for a particular speed of travel.

In my pending U.S. application No. 199,936, filed Nov. 18, 1971, I proposed a distance gauge which may be secured to the sun visor of an automobile for determining the distance such automobile should remain behind a lead automobile.

However, it is desirable to provide an integral hand held unit which may conveniently be utilized by either the driver or passenger of a vehicle and which need not be installed on the vehicle's sun visor thus reducing the criticalness of seat location with respect to the sun visor.

SUMMARY OF THE INVENTION

The integral hand held tailgating device of the present invention is characterized by a hand held tube having an eyepiece formed in one end thereof and a distance gauge formed in the other end thereof. The distance gauge includes a transparent window having a plurality of sets of transversely spaced indicia marked thereon to indicate various speeds of travel and spaced apart a distance such that the width of a lead vehicle will fill the space between the respective sets of indicia when the trailing automobile is the recommended distance behind such lead vehicle for the various speeds indicated by such indicia.

The objects and advantages of the present invention will become apparent from a consideration of the detailed description when taken in conjunction with the accompanying drawing.

DESCRIPTION OF THE DRAWING

FIG. 1 is a diagramatic view depicting a trailing vehicle having a driver therein utilizing a tailgating device embodying the present invention;

FIG. 2 is a perspective view of the tailgating device shown in FIG. 1;

FIG. 3 is a horizontal sectional view, in enlarged scale, taken along the line 3—3 of FIG. 2;

FIGS. 4 and 5 are transverse sectional views taken along the line 4—4 of FIG. 3;

FIGS. 6 and 7 are transverse sectional views similar to FIG. 4 but depicting two additional embodiments of the integral tailgating device of present invention.

DESCRIPTION OF THE PREFERRED EMBODIMENT

Referring to FIGS. 1 and 3, the integral hand held tailgating device of present invention includes, generally, a hand held tube 11 mounting an eyepiece 13 on one end thereof, such eyepiece being formed with an aperture 15 through which a viewer may view. Disposed in the opposite end of such tube 11 is a distance gauge, generally designated 17, and forming a transparent window having a vertically extending relatively broad index line 19 (FIG. 4) and a plurality of relatively fine vertically extending speed indicator lines 21, 23 and 25 adjacent which the speeds of 45, 55 and 65 miles per hour are indicated. The respective speed lines 21, 23 and 25 are each spaced a sufficient distance from the index line 19 to cause the transverse distance between such index line and the respective speed line to be totally occupied by the apparent transverse width of a lead vehicle 27 when such lead vehicle is viewed through the aperture 15 by a passenger 29 in a trailing car when such trailing car is spaced the distance behind such lead car 27 recommended for the particular speed of travel.

As noted in my above-mentioned application, a certain correlation exists between the apparent width of a lead car 27 as viewed through the distance gauge 17 and the distance by which a trailing car 31 is trailing such lead car 27. Thus, noting the triangle formed by the opposite sides 35 and 37 of the divergent viewing path of a viewer viewing through the tube 11, it will be appreciated that when the eyepiece 13 is a distance C behind the lead vehicle 27, and the apparent width B of the image of such lead car 27 fully occupies the space B between the index line 19 and the 55 mile-per-hour line 23, one can consider similar triangles and approximately express the relationship between the actual width D of the lead car 27, distance C, apparent width B of the lead car 27 at the gauge 17 and distance A between the eyepiece 13 and gauge 17 as follows:

$$B/A = D/C$$

It has been observed that compact cars vary in width D between 5½ and 6 feet and that large cars are approximately 6½ feet in width D. Examples of recommended spacings C between cars traveling at 45, 55 and 65 miles per hour are 90, 110 and 130 feet, respectively, for normal driving conditions. Since A × D for a tube 11 which is 12 inches in length from the eyepiece 13 to the gauge 17 is equal to 12 inches × 6 feet (average car width) or 72 inch-feet, the spacings B for the speed indicator marks 21, 23 and 25 may be determined from the formula $B = 72$ in.-ft./$C$ Thus, the distance between the index line 19 and the 55 mile-per-hour line 23 should be 0.65 inches. Further, for the distances of 90 and 130 feet corresponding with the recommended distances C for a speed of 45 and 65 miles per hour, respectively, the spacings of the lines 21 and 25 from the index line 19 should be 0.80 inches and 0.55 inches, respectively.

Since the above calculations have assumed a 6 foot wide lead car, in actual practice the dimensions for the lines 21, 23 and 25 have actually been set approximately 0.050 inches closer than that indicated to assure a safe following distance behind cars having a width narrower than 6 feet and a more than safe distance for wider cars.

The tube 11 is conveniently constructed from opaque plastic, and the eyepiece 13 is in the form of an annular ring having a through aperture 15 formed therein.

In the embodiment shown in FIG. 1, the distance gauge 17 is in the form of a circular transparent plastic disc having the vertical lines 19, 21, 23 and 25 inscribed directly thereon.

A cylindrical hood, generally designated 41, is received telescopically over the front end of the tube 11 and is formed with an annular flange 43 which serves to hold the circular distance gauge 17 in place abutted against the end of such tube 11.

Conveniently, a handle 45 is provided with an upwardly opening semi-circularly shaped resilient yoke 47 for receipt intermediately over the tube 11.

The handle 45 is normally removed from the tube 11 and the disassembled tube and handle conveniently stored in the glove compartment or the like when such device is not in use, as for example during city driving or heavy, slow-moving traffic. When such device is to be used, the handle 45 may be quickly assembled on the tube 11.

In operation, the tailgating device of present invention may be utilized by either the driver 29 or front or rear seat passengers 51 or 53, respectively, riding in a trailing automobile 31 to determine the minimum safe distance such trailing automobile should remain behind the lead automobile 27. It will be appreciated that the rear seat passenger is approximately 5 feet behind the front seat passenger position and that the deviation introduced by the variation resulting from use by either front or rear seat passengers is well within the tolerance of this device.

When the trailing vehicle 31 approaches the rear of the lead vehicle 27, either the passenger 51 or driver 29 may grasp the handle 45 of the tailgating device and abut the rear of the eyepiece 13 against his cheek to view through the eyepiece aperture 15.

Assuming the vehicles 27 and 31 are traveling approximately 55 miles per hour, the trailing vehicle driver 29 can be assured that he is remaining more than the recommended 110 feet behind the lead vehicle 27 as long as the width D of the lead car 27 does not appear to fill the total width B formed between the index line 19 and 55 mile-per-hour line 23. Under such conditions, the opposite sides 35 and 37 of the divergent field of view pass on opposite sides of the lead car 27' (FIG. 1) giving the impression that the space B is not fully occupied. However, as the trailing vehicle 31 closes the distance between itself and the lead vehicle 27, the lead vehicle 27, as viewed through the distance gauge 17, will appear to grow larger and will eventually fully occupy the distance between such index mark 19 and 55 mile-per-hour line 23 to appear as shown in FIG. 5. At this time, the trailing vehicle driver 29 has closed the distance C to the minimum amount recommended and any further closing of such distance will result in an unsafe condition. Thus, further closing of the distance C will result in the width of the lead car 27 appearing to overlap the opposite sides of the divergent path of view thus resulting in such car 27 appearing wider than the distance between the index line 19 and 55 mile-per-hour line 23 as indicated by the broken line image 27'' in FIG. 1. Thus, the driver 29 is alerted that he is following the lead car 27 too closely and should, therefore, slow down or change lanes.

The modification of the tailgating device of present invention shown in FIG. 6 reveals a distance gauge, generally designated 51, which may be received in the hood 41 and includes a stepped window 53 forming three different widths 55, 57 and 59 which correspond in width with the distances between the index line 19 and corresponding index lines 21, 23 and 25 for the distance gauge 17 shown in FIGS. 4 and 5. Thus, the viewer will merely view the lead vehicle 27 through the appropriate width 55, 57 or 59 corresponding with the speed at which the trailing car 31 is traveling to obtain an indication of the proper distance such trailing car should remain behind the lead car 27.

The modification of the tailgating device of present invention shown in FIG. 7 is similar to that shown in FIG. 1 except that the tube 11' is formed with an upwardly opening slot 61 which receives a transparent plastic card, generally designated 63, which has a stepped aperture 53 formed therein and projects from the wall of the tube 11 to form a finger-grasp tab 64. Thus, various cards 63 having aperture widths corresponding to following specialized vehicles, such as wide trucks, narrow motorcycles or automobiles having standard spaced viewable indicia on the rear thereof for sighting purposes may be conveniently used interchangeably in such device.

From the foregoing, it will be apparent that the tailgating device of present invention provides a convenient and economical means to enable a passenger in a trailing vehicle to aid the driver of such vehicle in determining how closely he should approach a leading vehicle thus contributing to safety on the highways.

I claim:

1. An integral hand held tailgating device for use by a passenger in a trailing vehicle to determine when such trailing vehicle is spaced recommended distances behind a lead vehicle of a predetermined width for respective selected speeds of travel and comprising:
    an elongated tube having front and rear ends and defining an optically uncorrected visual path;
    an eyepiece mounted in the rear end of said tube and formed with an aperture disposed in said path and including a rearwardly facing abutment surface;
    a distance gauge overlying the front end of said tube and spaced a predetermined distance from said abutment surface, said gauge including a transparent window;
    a plurality of sets of vertically extending indicator lines spaced apart respective horizontal distances corresponding with the apparent width of said lead vehicle for said recommended distances as viewed with the viewer's eye placed immediately behind said aperture;
    indicia corresponding to said selected speed disposed adjacent said respective indicator lines; and
    a hood removably telescoped over said front end of said tube and formed with interior retaining flange means for engaging said gauge and retaining it against said front of said tube, whereby a passenger in said trailing car may place said abutment against his face to view said lead vehicle along said optical path and through said window and can then determine when said trailing car is the recommended distance behind a lead vehicle for said selected speeds of travel.

2. An integral hand held tailgating device as set forth in claim 1 wherein:

said sets of indicia include an index mark and a plurality of speed indicating marks spaced said respective selected distances from said index mark.

3. An integral hand held tailgating device as set forth in claim 1 wherein:

said sets of indicator lines are in the form of first, second and third sets spaced apart substantially 0.55, 0.66 and 0.80 inches, respectively; and said indicia include the numbers 65, 55 and 45 disposed adjacent said respective first, second and third sets.

* * * * *